United States Patent [19]

Newman, Jr. et al.

[11] 4,100,491
[45] Jul. 11, 1978

[54] AUTOMATIC SELF-CLEANING FERROMAGNETIC METAL DETECTOR

[75] Inventors: Francis Marion Newman, Jr.; H. Stanley Silvus, Jr., both of San Antonio, Tex.

[73] Assignee: Southwest Research Institute, San Antonio, Tex.

[21] Appl. No.: 772,658

[22] Filed: Feb. 28, 1977

[51] Int. Cl.² .......................................... G01R 33/12
[52] U.S. Cl. .................... 324/204; 200/61.09; 324/235; 335/305; 340/606; 340/631
[58] Field of Search .................. 324/41, 204, 235; 335/305; 340/239 R, 270; 200/61.09

[56] References Cited

U.S. PATENT DOCUMENTS

| 3,373,352 | 3/1968 | Huigens | 324/41 |
| 3,676,773 | 7/1972 | Eckhardt | 340/270 |

Primary Examiner—Robert J. Corcoran
Attorney, Agent, or Firm—Gunn & Lee

[57] ABSTRACT

A ferrous metal detecting apparatus is disclosed for detecting metal particles in a flowing fluid, such as engine oil. The detecting apparatus has soft-iron pole pieces with a bridging gap therebetween. The soft-iron pole pieces are electrically insulated from each other and magnetized by direct current through an electromagnetic coil. After a sufficient amount of ferrous metal has accumulated on the bridging gap, a level detector will give a warning signal and cause the electromagnetic coil to degauss the soft-iron pole pieces by applying an alternating current to the electromagnetic coil. After the flowing fluid has washed away the ferrous metal, the direct current will remagnetize the soft-iron pole pieces. If repeated warning signals are within predetermined time intervals, an indication of the amount of ferrous metal contained in the fluid can be interpolated. The recycling for repeated warning signals may be automatically provided through a timing circuit and control logic.

27 Claims, 6 Drawing Figures

AUTOMATIC SELF-CLEANING FERROMAGNETIC METAL DETECTOR

BACKGROUND OF THE INVENTION

This invention relates to a ferrous metal detecting apparatus, commonly called a "chip detector," for detecting ferrous metal particles in a flowing fluid and, more particularly, to an automatic self-cleaning integrating ferromagnetic metal detector that will provide a series of step warnings to indicate the quantity of metal particles in the fluid. The detecting apparatus includes soft-iron pole pieces that can be magnetized and demagnetized. Upon collection of a sufficient quantity of metal particles to bridge a gap between the soft-iron pole pieces, a level detector will activate a logic circuit to demagnetize (degauss) the soft pole pieces thereby allowing the collected metal particles to be washed away by the fluid. The time required for repeated triggering of the level detector after remagnetization of the soft pole pieces is monitored by a timing circuit for an appropriate warning if the repeated metal particle collection to bridge the gap is within a predetermined time interval.

BRIEF DESCRIPTION OF THE PRIOR ART

Prior to the present invention, many different types of chip detectors embodying numerous principles have been used to determine the amount of metal particles (chips) in nonconductive fluids, particularly engine oil. Many of the prior chip detectors used some type of insulated permanent magnet with a portion being exposed to fluid being monitored. If a sufficient amount of conductive ferromagnetic chips is collected on the tip of a permanent magnet to bridge insulation to a metal housing, current would begin to flow thereby giving an appropriate warning signal. A typical magnetic chip detector is shown in Pool, et al. (U.S. Pat. No. 3,404,337) wherein the permanent magnet is located in the insulated center portion of a plug to be screwed into the housing. The plug housing is grounded, and, if a current begins to flow between the permanent magnet and the housing, it will be detected by an appropriate metering system.

Another similar chip detector is shown in Prestel (U.S. Pat. No. 3,193,815). Normally the prior art shows some type of DC voltage being applied to the permanent magnet via an appropriate warning indicator so that upon current flow through the permanent magnet to ground, the warning device would be activated.

In Huigens (U.S. Pat. No. 3,373,352), a coil is inserted into the fluid flow. Upon collection of metal particles on the coils, various turns of the coils would be shorted out thereby reducing the impedance of the coil. By measuring the impedance or voltage drop of the coil, the amount of particles collected on the coil could be interpolated. By stopping any current flow through the coil, some of the metal particles would be removed from the coil by continued fluid flow.

None of the prior art known to applicant discloses semipermanent magnets used in a chip detection device wherein the semipermanent magnets are magnetized and demagnetized upon collection of sufficient ferromagnetic particles to bridge a gap therebetween. The demagnetization of the semipermanent magnets (soft-iron pole pieces) allows fluid flowing over the tips of the semipermanent magnets to remove any metal particles collected thereon.

All of the prior devices for chip detection simply give a single warning, which may or may not be true, to indicate the quantity of metal particles contained in the fluid. In many situations, it is very critical to know with some degree of certainty the quantity of metal particles contained in the fluid. For example, it is essential to know the amount of metal particles contained in the oil of a helicopter engine. If a helicopter is in use in a combat situation, a false warning of metal particles in the engine oil could result in a premature termination of the mission. However, if a critical level of metal particles in the oil has been reached, it is essential to terminate the mission to avoid engine failure which could result in the loss of numerous lives.

SUMMARY OF THE INVENTION

Therefore, it is an object of the present invention to provide an automatic self-cleaning ferromagnetic metal detector.

It is another object of the present invention to provide a ferromagnetic detector, the cycle of which may be repeated for subsequent indications to verify the accuracy of a prior warning.

It is yet another object of the present invention to provide an automatic ferromagnetic detector wherein soft-iron pole pieces are magnetized thereby causing metal particles to collect on the tips thereof. After a sufficient amount of metal particles have collected on the tips of the soft-iron pole pieces to bridge a gap therebetween, a level detector will trigger appropriate control logic to give a warning indication. The control logic also degausses the soft-iron pole pieces via an electromagnetic coil. Fluid flow over the tips of the soft-iron pole pieces washes away the metal particles collected thereon. Thereafter, upon remagnetizing the soft-iron pole pieces by the control logic, if sufficient metal particles to trigger the level detector are again accumulated to bridge the gap within a predetermined time period, the control logic will give a second-stage warning. The cycle may again be repeated for as many stages or warning levels as would be desirable for the particular operating condition.

The control logic first applies a direct current to the electromagnetic coil surrounding the soft-iron pole pieces thereby creating a semipermanent magnet. After the level detector has been triggered by a sufficient amount of metal particles on the tips of the soft-iron pole pieces, DC voltage being applied to the soft-iron pole pieces is removed, and an alternating current is applied to the electromagnetic coils to demagnetize or degauss the soft-iron pole pieces. After a sufficient period of time has passed for the washing of metal particles from the tips of the soft-iron pole pieces, the direct current is again applied to the electromagnetic coils to remagnetize the soft-iron pole pieces for repeated cycles.

DESCRIPTION OF THE PREFERRED EMBODIMENT

Figure 1:
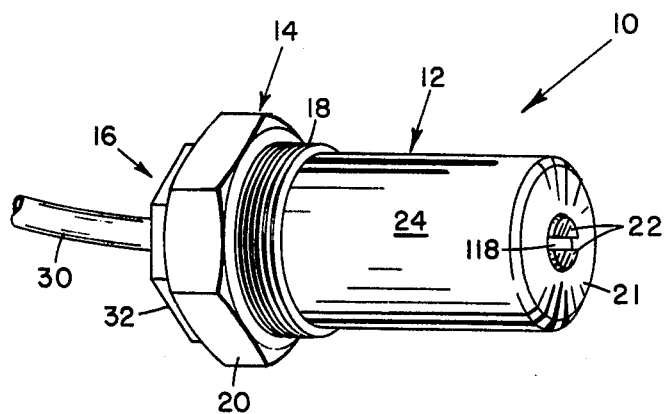
FIG. 1 is a perspective view of the ferromagnetic metal detector.
Figure 2:
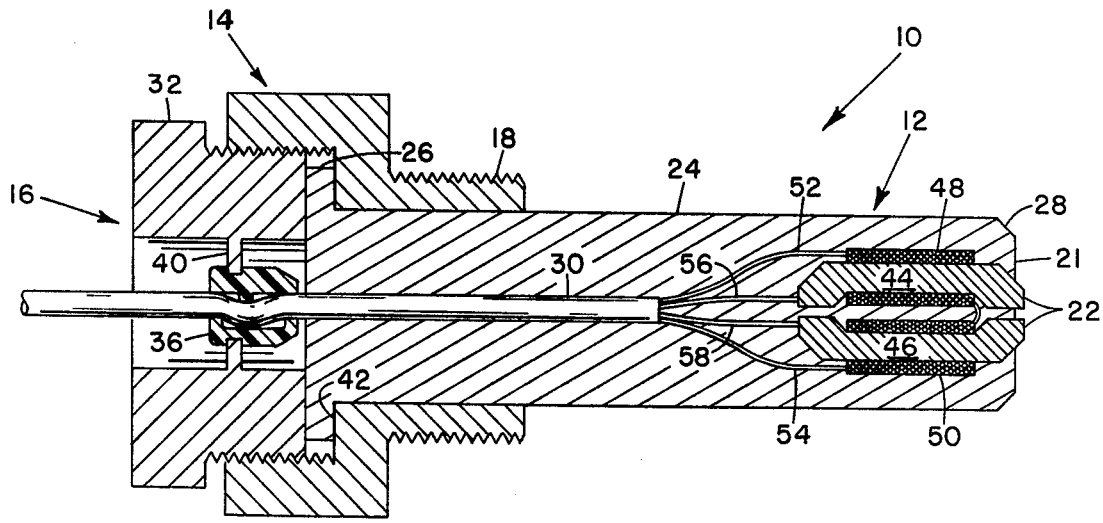
FIG. 2 is an elongated cross-sectional view of the ferromagnetic metal detector shown in FIG. 1.

Referring to FIGS. 1 and 2 in combination, a ferromagnetic metal detector, represented generally by reference numeral 10, is shown. The metal detector 10 is designed for use in the flow line of a fluid having low electrical conductivity, such as an oil line for oil flowing through an engine. While many other uses may be made of the ferromagnetic metal detector 10, one of the primary design considerations is for use in the flow lines of aircraft engines, particularly helicopters.

The ferromagnetic metal detector 10 includes a probe portion 12, mounting portion 14 and a probe retaining portion 16. The metal detector 10 may be very easily mounted into a flow line (not shown) by means of threads 18 and nut 20 of mounting portion 14. The probe portion 12 has a pair of probe tips 22 extending from the end 21 thereof. The probe portion 12 has a cylindrical extension 24 formed integral with a flange 26 for mounting purposes. The cylindrical extension 24 has a beveled surface 28 to allow for ease of insertion into a flow line, and to decrease resistance to fluid flow. An electrical cable 30 connects to the probe tips 22 as will be subsequently explained in more detail. The electrical cable 30 extends through the flanged end of the probe portion 12 and through probe retaining portion 16. The probe retaining portion 16 has a mounting nut 32 with a strain relief 36 to hold the electrical cable 30 securely in position. The mounting nut 32 is threadably connected to mounting portion 14.

Referring now to the probe portion 12, the probe tips 22 form a portion of a pair of soft-iron pole pieces 44 and 46 arranged as shown in FIG. 2. Surrounding the soft-iron pole pieces 44 and 46 are coils 48 and 50, respectively. One side of coil 48 is connected to lead 52, and the other side of coil 48 connected to coil 50. The opposite side of coil 50, after series connection with coil 48, is connected to lead 54. Soft-iron pole pieces 44 and 46 are connected to leads 56 and 58, respectively. All of the leads 52, 54, 56 and 58 form a part of cable 30 described hereinabove.

While the particular construction of the probe portion 12 may vary without varying from the principles of this invention, applicant mounts the soft-iron pole pieces 44 and 46 with their respective coils 48 and 50 by means of a nonconducting epoxy resin which will provide the insulation and strength desired. By use of a nonconducting epoxy resin upon forming of the cylindrical extension 24, all of the components forming a part of the probe portion 12 are securely located in a permanent position.

The space (hereinafter called sending gap 118) between probe tips 22 may also be filled with the nonconducting epoxy resin and made flush therewith. The filling of the sensing gap 118 would prevent the sticking of particles during a demagnetization cycle which will be explained hereinbelow. Only the very ends of probe tips 22 need to be exposed to the flowing fluid.

Figure 3:
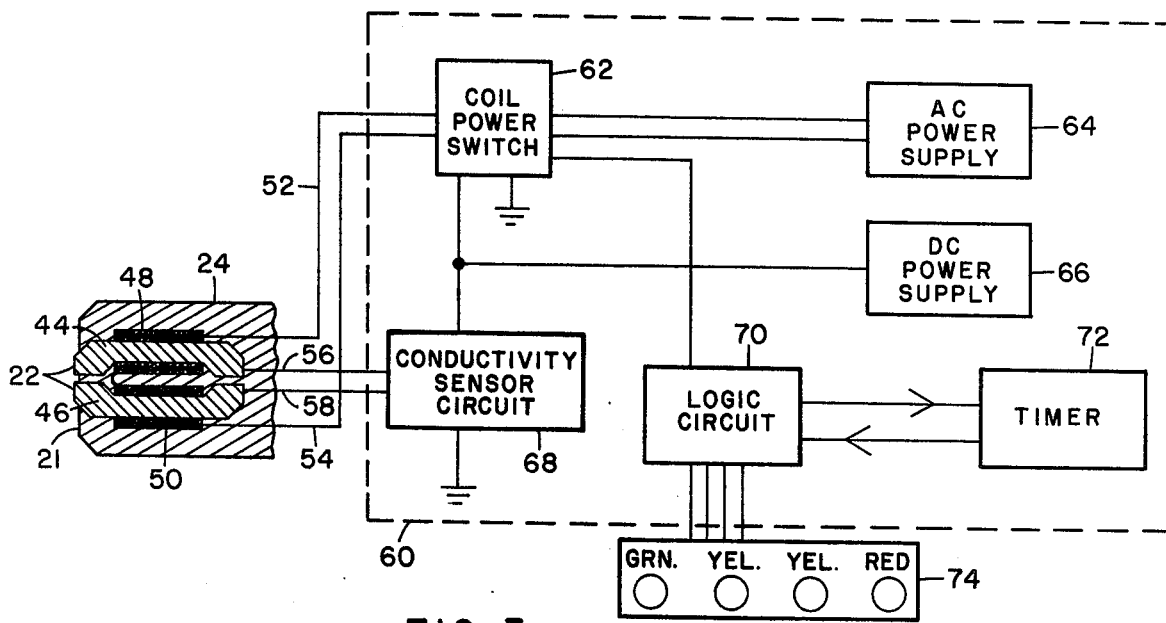
FIG. 3 is an illustrative block diagram of the control logic and warning panel used in conjunction with the ferromagnetic metal detector shown in FIGS. 1 and 2.

Referring now to FIG. 3 of the drawings, there is shown a partial sectional view of the cylindrical extension 24 of the probe portion 12. Control logic 60 is connected to leads 52, 54, 56 and 58, which control logic cycles the ferromagnetic metal detector 10 in a manner as will be subsequently described. The control logic 60 is divided into general block diagram subsections. Current flows through coils 48 and 50 via leads 52 and 54 from coil power switch 62. The coil power switch 62 receives its voltage from an alternating current (AC) power supply 64 and a direct current (DC) power supply 66. The soft-iron pole pieces 44 and 46 connect via leads 56 and 58 to conductivity sensor circuit 68, which also receives power from DC power supply 66. The output of conductivity sensor circuit 68 operates logic circuit 70 via coil power switch 62 in conjunction with timer 72. The logic circuit 70 controls the operation of a series of warning lights on warning light panel 74.

Figure 4:
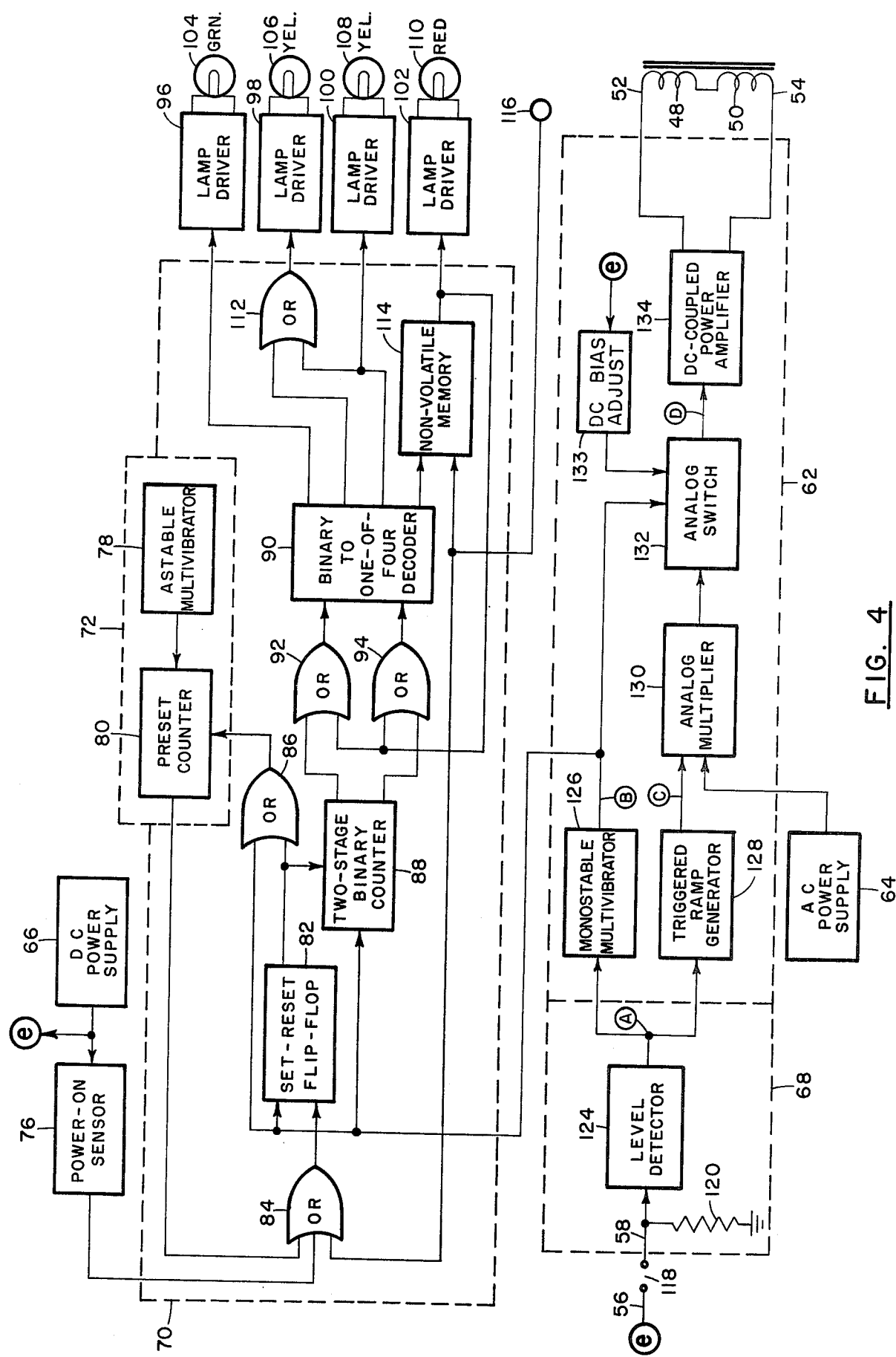
FIG. 4 is a detailed block diagram of the control logic of the ferromagnetic metal detector shown in FIGS. 1 and 2, and illustrated generally in FIG. 3.

Referring now to FIG. 4 of the drawings, a more detailed functional block diagram for the control logic 60 is shown. It should be understood that other types of control logic circuits may be utilized; however, the control logic as shown in FIG. 4 provides an automatic, self-cleaning ferromagnetic metal detector. The control circuit as shown in FIG. 4 has six operating conditions, which are as follows:

1. Power-on reset.
2. Initial metal detection event.
3. Second metal detection event occuring within a preset time delay.
4. Third metal detection event occuring within a preset time delay.
5. Preset time delay expires before next metal detection event occurs (applies only after first and second metal detection events).
6. Authorized reset following Condition 4 above.

Functions of block diagram shown in FIG. 4 are described hereinbelow.

When the DC power supply 66 is turned ON, it will be sensed by power-on sensor 76. The power-on sensor 76, which may be a standard component item, provides an output signal to reset the control logic 60 each time DC power supply 66 is turned ON. This is the first of the previously listed operating conditions.

An astable multivibrator 78, which may be temperature compensated to provide a stable time based generator, is the heart of the timer 72. While any time based astable multivibrator may be used, the astable multivibrator 78 delivers an output pulse every minute to a preset counter 80. Prior to receiving the first metal detection event, the preset counter 80 is maintained in its preset condition by an output from set-reset flip-flop 82. Set-reset flip-flop 82 is reset by the initial signal received from power-on sensor 76 via OR gate 84. The output from set-reset flip-flop 82 connects to the preset counter 80 via OR gate 86. While the preset counter 80 is in the preset condition as controlled by set-reset flip-flop 82, the preset counter 80 will ignore pulses received from the astable multivibrator 78.

A two-stage binary counter 88 is also reset by set-reset flip-flop 82. Upon occurrence of a first metal detection event (as will be subsequently described in more detail), the two-stage binary counter 88 will count the event on the terminating transient of the signal voltage. The output of the two-stage binary counter 88 controls a standard binary to one-of-four decoder 90 via OR gates 92 and 94. Outputs from the binary to one-of-four decoder 90 control lamp drivers 96, 98, 100 and 102 by each successive output, either directly or through intervening logic. Lamp drivers 96, 98, 100 and 102 control warning lights 104, 106, 108 and 110, respectively.

Warning light 106 is maintained in the ON condition even when the third output pulse from binary to one-of-four decoder 90 has activated warning light 108 by means of OR gate 112. To correspond with normal warning signals, warning light 104 is green indicating the engine is being monitored for detection of metal particles. Upon receiving the first and second metal detection events, the warning lights 106 and 108 which are yellow will be illuminated to indicate a further cautionary state in operation of the engine. Upon receiving the third metal detection event, warning light 110 is red to indicate ceasing of engine operation immediately.

A non-volatile memory 114 receives the output from binary to one-of-four decoder 90 intended for lamp driver 102. The non-volatile memory 114 will give an output for lamp driver 102 to maintain the red warning light 110 in the ON condition. The non-volatile memory 114 may be (1) a mechanical or magnetic latching relay, (2) an erasable programmable read only memory, or (3) a complementary metal-oxide-silicon set-reset flip-flop operating from a rechargable battery power supply. The non-volatile memory 114 prevents the unauthorized resetting of the conrol logic 60 thereby eliminating the red warning signal 110. The most critical alarm condition as indicated by the red warning light 110 cannot be overridden by simply turning power to the circuit OFF and then ON again. The non-volatile memory 114 can only be reset by the authorized manual reset 116, which is not accessible to the operator of the vehicle, but is only accessible to maintenance personnel. The authorized manual reset 116 also resets set-reset flip-flop 82, the two-stage binary counter 88 and the preset counter 80.

The output of the DC power supply 66 (connection indicated by the letter "e" in a circle) applies a DC voltage through lead 56 to the sensing gap 118 between the probe tips 22 of the soft-iron pole pieces 44. When sufficient ferromagnetic metal particles have collected on sensing gap 118 to bridge the probe tips 22, current will flow through lead 56, through the ferromagnetic metal particles collected between probe tips 22 forming sensing gap 118, through lead 58 and through resistor 120 to ground. Once the current flow through resistor 120 reaches a predetermined value, level detector 124 will be activated by the voltage developed there-across.

The coil power switch 62 includes a monostable multivibrator 126 and a triggered ramp generator 128, both of which receive the output from the level detector 124. An analog multiplier 130 receives an alternating voltage from AC source 64, as well as the output from triggered ramp generator 128. An output from the analog multiplier 130 connects to a single-pole double-throw analog switch 132 which receives its control signal from monostable multivibrator 126.

By the output received from monostable multivibrator 126, set-reset flip-flop 82 is set and two-stage binary counter 88 counts its first input signal indicating a collection of ferromagnetic particles on the probe tips 22 of the metal detector 10. Also, the output of the monostable multivibrator 126 triggers the analog switch 132 so that an output from the analog multiplier 130, which consists of an alternating voltage received from AC source 64, will be fed through DC-coupled power amplifier 134 to coils 48 and 50 via leads 52 and 54. The analog switch 132 receives a DC bias from DC power supply 66. The DC bias level may be set by a suitable DC bias adjust 133.

During normal operation, the coil power switch 62 passes direct current through the coils 48 and 50 of the metal detector 10. The direct current will magnetize the soft-iron pole pieces 44 and 46 to cause ferromagnetic particles from a flowing fluid (such as lubricating oil) to collect on the probe tips 22 thereby bridging sensing gap 118. On command from the level detector 124 via monostable multivibrator 126, a gradually decreasing alternating current flows through coils 48 and 50 to demagnetize (degauss) the soft-iron pole pieces 44 and 46. The flowing fluid will wash away the ferromagnetic particles collected on the probe tips 22 thereby providing the self-cleaning operation.

METHOD OF OPERATION

Figure 5:
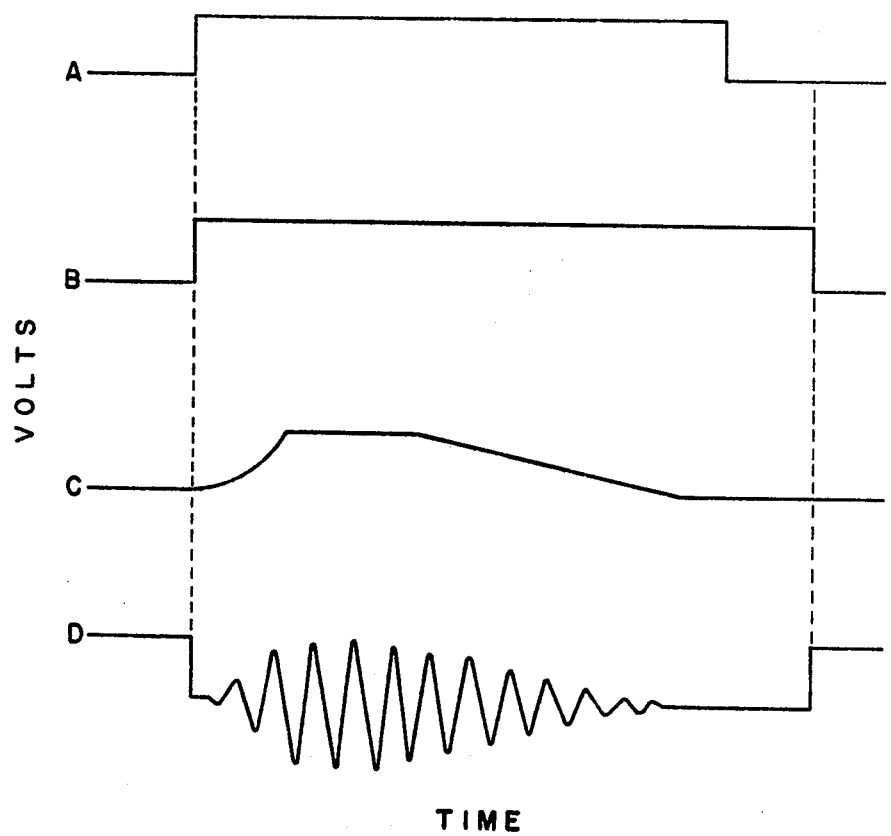
FIG. 5 is a series of voltage waveforms plotted against time for the demagnetization cycle of FIG. 4.

In the normal mode of operation, the analog switch 132 applies a DC bias to the DC-coupled power amplifier 134 which, in turn, causes direct current to flow through the coils 48 and 50, thus providing a constant, unidirectional magnetic field in the soft-iron pole pieces 44 and 46, and across the sensing gap 118 between probe tips 22. Whenever a sufficient number of ferromagnetic particles have collected between the probe tips 22 so that a predetermined current will flow through resistor 120, the level detector 124 will give an output signal at point A of FIG. 4 that corresponds to waveform A in FIG. 5. Waveform A has a fast transition time as can be seen in FIG. 5. The leading edge of waveform A from level detector 124 triggers both the monostable multivibrator 126 and the triggered ramp generator 128. The output of the monostable multivibrator 126 at point B of FIG. 4 is the same as waveform B of FIG. 5. The output from the monostable multivibrator 126 triggers the analog switch 132 so that the output of the analog multiplier 130 is fed to the DC-coupled power amplifier 134.

The triggered ramp generator 128 produces a special waveform at point C of FIG. 4 as illustrated by waveform C of FIG. 5. Waveform C, when multiplied by a sinusoid in the analog multiplier 130, produces a modulated sine wave voltage at point D of FIG. 4 as illustrated in waveform D in FIG. 5. The voltage waveform at point D and the current waveform through the coils 48 and 50 are identical. Waveform D is amplified prior to being received by the coils 48 and 50. The modulated sinusoid current through the coils 48 and 50 demagnetizes the core material, namely soft-iron pole pieces 44 and 46. Following demagnetization, sufficient time is allowed for the flowing fluid to wash away any ferromagnetic particles collected at the probe tips 22 in sensing gap 118. At the conclusion of the washing period, monostable multivibrator 126 returns to its zero state thereby allowing the analog switch 132 to return to its original state wherein a DC voltage is applied to coils 48 and 50. The DC voltage applied to coils 48 and 50 will again magnetize the soft-iron pole pieces 44 and 46 to repeat the collection of ferromagnetic particles. At some point between the time the alternating current demagnetization waveform D is reduced to zero, and termination of the output (waveform B) of the monostable multivibrator 126, bridging of the sensing gap 118 will cleared by washing action of the fluid. This permits the level detector output (waveform A) to return to its normal zero state. The demagnetization cycle is terminated when the output of the monostable multivibrator 126 returns to its zero state.

After turning the power ON and the occurrence of the poweron reset by the power-on sensor 76, the initial operating condition has occurred. Thereafter, when sufficient ferromagnetic material has collected to bridge the sensing gap 118, the second operation condition (initial metal detection event) has been met. A demagnetization cycle is initiated by the level detector 124 and the monostable multivibrator 126 sets the set-reset flip-flop 82 to remove the signal from OR gate 86. The output of the monostable multivibrator 126 maintains the preset condition in preset counter 80 for the duration of the output pulse of the monostable multivibrator 126. The trailing edge of the monostable multivibrator 126 causes the two-stage binary counter 88 to advance one count, and removes the preset signal from the preset counter 80 thereby permitting the preset counter 80 to count pulses received from the astable multivibrator 78 at the rate of 1 pulse per minute.

Prior to the occurrence of the initial metal detection event, the output of the binary counter 88 (which is initially set at zero) will maintain the green warning light 104 in its illuminated condition through binary to one-of-four decoder 90. When the two-stage binary counter advances to its first count position, the green warning light 104 is extinguished and the yellow warning light 106 is illuminated.

If another metal detection event occurs before the preset counter 80 has reached the end of its count, then another demagnetization cycle by the coil power switch 62 is initiated. This time, however, the set-reset flip-flop 82 is already set and the leading edge of waveform B from the monostable multivibrator 126 only restores the preset condition in preset counter 80. The trailing edge of the output of the monostable multivibrator 126 removes the present signal from preset counter 80 thereby allowing it to again begin counting pulses received from the astable multivibrator 78. Also the trailing edge of waveform B from the monostable multivibrator 126 causes the two-stage binary counter to advance one count. The advancing of the binary counter 88 one additional count will cause the binary to one-of-four decoder 90 to give its second output to illuminate yellow warning light 108. OR gate 112 will also maintain yellow warning light 106 in the ON condition.

If a third metal detection event occurs before the preset counter has reached the end of its second count, another demagnetization cycle as previously described is again initiated. Again, the leading edge of the output (waveform B) of the monostable multivibrator 126 presets the preset counter 80, and the trailing edge of waveform B of the monostable multivibrator causes the two-stage binary counter 88 to advance one count. Upon advancing of the two-stage binary counter 88 by one additional count, an output of the binary to one-of-four decoder 90 is energized thereby activating non-volatile memory 114. At the same time, yellow warning lights 106 and 108 are extinguished and red warning light 110 s illuminated. Also by means of a feedback from the output of non-volatile memory 114 through OR gates 92 and 94, the binary to one-of-four decoder 90 is locked to its current state independent of changes which may occur elsewhere in the control logic 60. Even though additional metal detection events may occur, the red warning light 110 remains latched to the ON condition.

Once the red warning light 110 has been illuminated by the third successive metal detection event within preset time limits, the automatic ferromagnetic metal detector 10 and associated control logic 60 are latched into a permanent alarm condition by the non-volatile memory 114. Even though power may be turned OFF and then back ON to the control logic 60, the warning light 110 will remain illuminated. Only authorized manual reset 116, which is inaccessible to crew members that may be operating the vehicle, can be used to erase the non-volatile memory 114 during maintenance operations. For example, if the non-volatile memory 114 is an erasable, programmable read-only memory, an authorized reset of the non-volatile memory 114 could be accomplished by ultraviolet radiation through a small window in the non-volatile memory 114. Regardless of the non-volatile memory 114 that is being utilized, authorized maintenance or supervisory personnel should be the only individuals that could restore ferromagnetic metal detector 10 and its control logic 60 to normal operation. This insures the reporting of critical ferromagnetic metal detection events.

ALTERNATIVE EMBODIMENT

Figure 6:
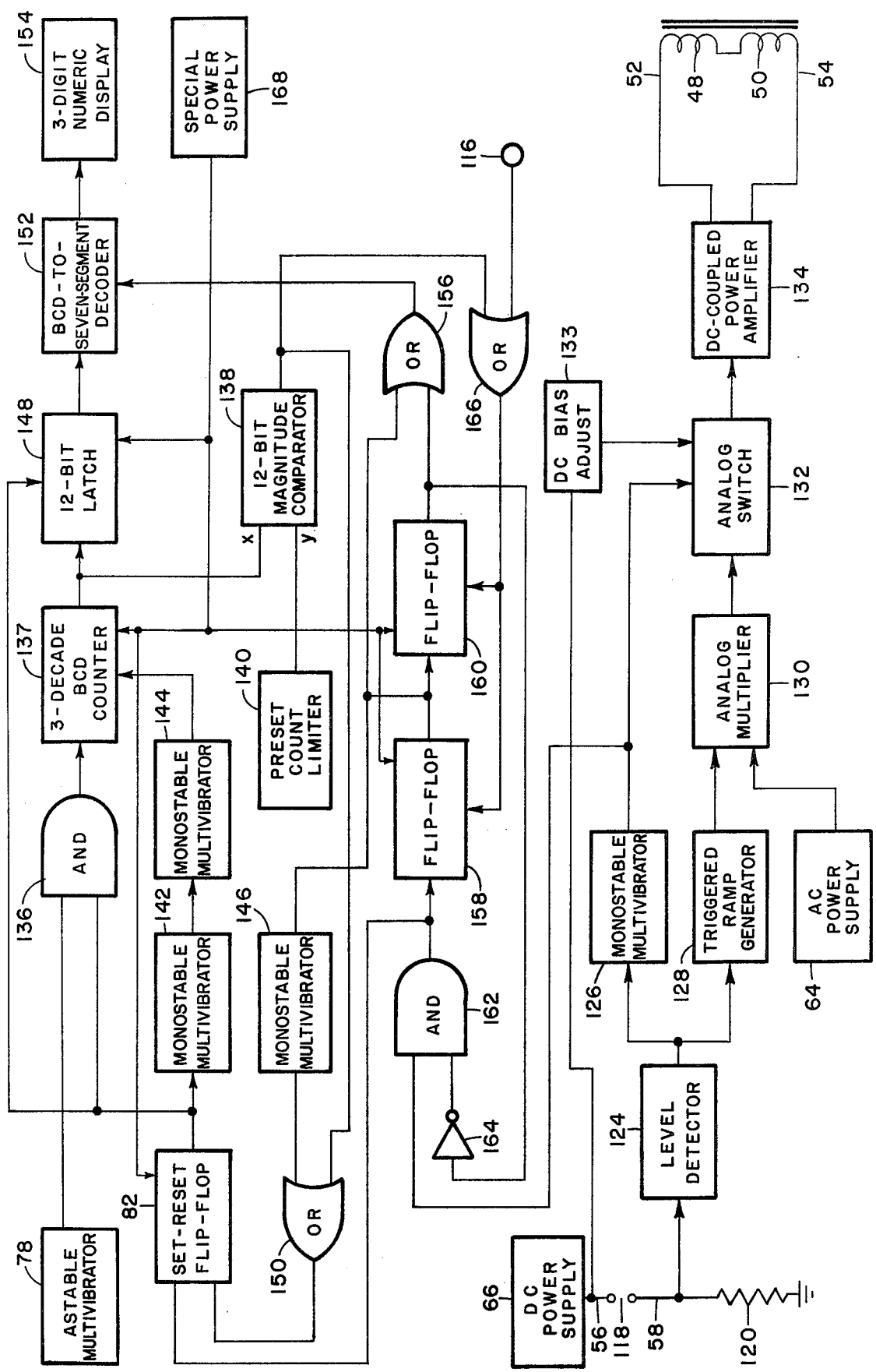
FIG. 6 is an alternative detailed block diagram of the control logic for the ferromagnetic metal detector shown in FIGS. 1 and 2.

Referring to FIG. 6 of the drawings, there is shown an alternative control logic 60 that may be used with the ferromagnetic metal detector 10. Like components as shown in FIG. 4 of the preferred embodiment will be given the same reference numerals. The alternative control logic 60 as shown in FIG. 6 has four fundamental conditions which are as follows:
1. Initial metal detection event.
2. Second metal detection event occuring within a preset time interval.
3. Preset time delay expires before second metal detection event occurs.
4. Authorized reset following Condition 2 hereinabove. The functions of the block diagram shown in FIG. 6 that are different from the block diagram shown in FIG. 4 are described hereinbelow.

The astable multivibrator 78 may be of the same type previously used to deliver one pulse per minute to a 3-decade BCD counter 137 via AND gate 136. The 12 output lines of BCD counter 137 drive the "$x$" inputs of a 12-bit magnitude comparator 138. The "$y$" inputs of the magnitude comparator 138 are controlled by a preset count limiter 140, which may be set by (1) adjustable controls means, such as a selector switch, or (2) hardwired connections. When the count stored in the BCD counter 137 equals the count of the present count limiter 140, an output is given by the magnitude comparator 138 indicating that the "$x$" input equals the "$y$" input.

Control of the BCD counter 137 is accomplished by the previously described set-reset flip-flop 82, monostable multivibrators 142, 144 and 146, and associated logic. The AND gate 136 between the astable multivibrator 78 and the BCD counter 137 is controlled by the output of set-reset flip-flop 82. Under normal operating conditions, no output is received from the set-reset flip-flop 82, therefore no clock pulses from astable multivibrator 78 feed through AND gate 136 to the BCD counter 137. Monostable multivibrator 144, which is triggered by the fall of the output of monostable multivibrator 142, resets the BCD counter 137 to zero at appropriate times as described hereinbelow. Monostable multivibrator 142 is triggered by the fall of the output of the set-reset flip-flop 82, and delays reset of the BCD counter 137 until after the count contained in the BCD counter 137 has been fed to 12-bit latch 148 by means of a strobe output from set-reset flip-flop 82. Monostable multivibrator 146 resets the set-reset flip-flop 82 via OR gate 150. The set-reset flip-flop 82 can also be reset by the output from magnitude comparator 138 indicating that the count output from BCD counter 137 is equal to the count set into preset count limiter 140 via OR gate 150.

The 12-bit latch 148 is used to capture and store the count received from BCD counter 137 should a second metal detection event occur before the preset count of the preset count limiter 140 is reached. While counting pulses from the astable multivibrator 78 is taking place, the strobe input of the 12-bit latch 148 is held in the logic state which permits the output of the latch 148 to follow the input directly. When the strobe input of the 12-bit latch 148 falls, the count contained in the 12-bit latch 148 is captured and held.

Outputs of the 12-bit latch 148 drive the input of a 3-digit BCD-to-seven-segment decoder 152 which, in turn, controls a 3-digit numeric display 154. Any type of readout in the 3-digit numeric display 154 could be utilized including, but not limited to, light emitting diodes, gas discharge, fluorescent, liquid-crystal or incandescent lights. A blanking input to the BCD-to-seven-segment decorder 152 received via OR gate 156 provides for (1) maintaining the display in a normally OFF condition, and (2) turning the display ON whenever counting is in process or a second metal detection event occurs within the preset time period controlled by preset count limiter 140.

The event counter function of the control logic 60 comprises two edge-triggered flip-flops 158 and 160, and associated logic. When the output from edge-triggered flip-flop 160 is zero, inverter 164 will maintain AND gate 162 in the open condition, thereby permitting output signals received from level detector 124 via monostable multivibrator 126 to trigger edge-triggered flip-flop 158, and to set set-reset flip-flop 82. Edge-triggered flip-flop 158 responds to the leading edge of the output of the level detector 124 and monostable multivibrator 126. Edge-triggered flip-flop 160, on the other hand, responds to the trailing edge of the output of edge-triggered flip-flop 158. When the output of edge-triggered flip-flop 160 changes state, AND gate 162 is closed via inverter 164. Therefore, additional output pulses received from level detector 124 via monostable multivibrator 126 will not pass through AND gate 162. If the output of both edge-triggered flip-flops 158 and 160 are OFF, then OR gate 156 will have an output that is received in BCD-to-seven-segment decoder 152 as a blanking signal. The blanking signal received by BCD-to-seven-segment decoder 152 from OR gate 156 extinguishes the 3-digit numeric display 154. An output from the 12-bit magnitude comparator 138, or an authorized reset 116 via OR gate 166, resets both edge-triggered flip-flops 158 and 160 to their zero state.

A special power supply 168 is necessary to provide an accurate logging of metal detection events, especially in cases of loss of power when the equipment being monitored is not in use. The special power supply 168 would comprise secondary cells, such as rechargable batteries, that may be recharged when power to the control logic 60 is ON. The function elements which require continuous power include (1) the set-reset flip-flop 82, (2) both edge-triggered flip-flops 158 and 160, (3) the 3-decade BCD counter 137, and (4) and 12-bit latch 148. The connection from the special power supply 168 to these subcomponents prevents their being reset except by an authorized manual reset 116.

METHOD OF OPERATION OF ALTERNATIVE EMBODIMENT

The detection of ferromagnetic particles at the sensing gap 118 by the level detector 124, and the magnetization and demagnetization of coils 48 and 50 is the same as described in the preferred embodiment. The leading edge of the output of monostable multivibrator 126 passes through AND gate 162 with the leading edge triggering edge-triggered flip-flop 158 and setting set-reset flip-flop 82. The output of edge-triggered flip-flop 158 through OR gate 156 removes the blanking from the BCD-to-seven-segment decoder 152 and 3-digit numeric display 154. The output of set-reset flip-flop 82 enables AND gate 136 thus permitting clock pulses from astable multivibrator 78 to be received into the 3-decade BCD counter 137. In addition, the output of the set-reset flip-flop 82 gives a strobe input to 12-bit latch 148 so that the output of the BCD counter 137 is transferred directly into the BCD-to-seven-segment decoder 152.

If the second metal detection event occurs before the count in the BCD counter 137 reaches the count preset into preset count limiter 140, a demagnetization cycle is automatically initiated and the output of the monostable multivibrator 126 passes through AND gate 162 to trigger edge-triggered flip-flop 158. Since edge-triggered flip-flop 158 is already in the set condition, the output will fall thereby triggering edge-triggered flip-flop 160 which triggers on the trailing edge. The output of edge-triggered flip-flop 160 by way of inverter 164 disenables AND gate 162 thereby terminating its output and preventing any further metal detection pulses from passing therethrough. In addition, the output of the edge-triggered flip-flop 160 via OR gate 156 maintains the 3-digit numeric display 154 in the unblanked condition. The falling transition of the output of edge-triggered flip-flop 158 also triggers monostable multivibrator 146 which resets set-reset flip-flop 82 via OR gate 150. As the output of set-reset flip-flop 82 falls, AND gate 136 is closed thereby terminating the count from astable multivibrator 78, and the strobe input for 12-bit latch 148 is disabled thereby capturing the count existing in the BCD counter 137. The fall of the output of set-reset flip-flop 82 also triggers monostable multivibrator 142 which, at the termination of its output pulse, triggers monostable multivibrator 144. The output of monostable multivibrator 144 resets the BCD counter 137 to zero. Thereafter, the control logic 60 remains in this condition until receiving an authorized manual reset 116.

If the count of the 3-decade BCD counter 137 reaches the preset count set into preset count limiter 140 before a second metal detection event occurs, then a pulse appears at the output of the 12-bit magnitude comparator 138. This output resets the set-reset flip-flop 82 via OR gate 150, and resets both edge-triggered flip-flops 158 and 160 thereby causing OR gate 156 to blank the output of BCD-to-seven-segment decoder 152. The resetting of set-reset flip-flop 82 closes AND gate 136 thereby terminating the count from astable multivibrator 78 and triggering monostable multivibrator 142. After a suitable delay, monostable multivibrator 142 triggers monostable multivibrator 144. The output of monostable multivibrator 144 resets the BCD counter 137 to zero thereby terminating the cycle. If the cycle is completed in this fashion, the control logic 60 remains ready to receive a new initial metal detection event.

If a second metal detection event occurs within the preset time interval controlled by preset count limiter 140, the control logic 60 latches in an alarm state, and it cannot be reset by turning power OFF and then ON again. Thus, authorized maintenance or supervisory personnel are required to restore the control logic 60 to its normal operation; therefore, a critical metal detection event cannot pass unnoticed.

The authorized manual reset 116 resets both edge-triggered flip-flops 158 and 160 via OR gate 166 thereby enabling AND gate 162 so that the control logic 60 may again receive metal detection pulses. Also, the authorized manual reset 116 resets edge-triggered flip-flops 158 and 160 which, via OR gate 156, blank the numeric display 154.

We claim:

1. A metal detector adapted for detecting ferromagnetic particles in a flowing fluid having low conductivity comprising:

probe means;

mounting means adapted for attachment to container means for said fluid, said mounting means securing at least one end of said probe means in said flowing fluid;

semipermanent magnetic pole means forming a part of said probe means with at least a portion of said semipermanent magnetic pole means being in contact with said flowing fluid;

coil means adjacent said semipermanent magnetic pole means;

voltage means;

control means connected to said coil means, said control means selectively causing direct current flow from said voltage means through said coil means to magnetize said semipermanent magnetic pole means, said magnetization of said semipermanent magnetic pole means causing said ferromagnetic particles to collect on said portion in contact with said flowing fluid;

said portion of said semipermanent magnetic pole means being constructed and arranged to have a gap therein, said gap being in contact with said flowing fluid;

a conductivity sensor circuit including said voltage means connected to said semipermanent magnetic pole means and measuring current flow therethrough from said voltage means upon said collection of ferromagnetic particles bridging said gap to generate a warning signal when said current flow reaches a predetermined level;

said warning signal being received by and activating said control means to supply alternating current from said voltage means to said coil means to demagnetize said semipermanent magnetic pole means thereby allowing said flowing fluid to carry away said collection of ferromagnetic particles.

2. The metal detector as given in claim 1 wherein said semipermanent magnetic pole means comprises at least a pair of soft iron pole pieces with a space therebetween forming said gap, said space being in series connection with said pair of soft iron pole pieces, said conductivity sensor circuit and said voltage means.

3. The metal detector as given in claim 2 wherein said coil means surround said pair of soft iron pole pieces for said magnetization and demagnetization.

4. The metal detector as given in claim 1 wherein said warning signal connects to and causes a first activation of a switching means in said control means to stop a direct current flow from said voltage means to said coil means and to start an alternating current flow from said voltage means to said coil means, said alternating current flow demagnetizing said semipermanent magnetic pole means.

5. The metal detector as given in claim 4 wherein said control means comprises timer means activated by said warning signal, after a first time interval said timer means causing a second activation of said switching means to restore said direct current after termination of said alternating current.

6. The metal detector as given in claim 5 wherein said control means comprises memory means to record repeated warning signals caused by said collection of said ferromagnetic particles on said gap within a second time interval as set by said timer means from the prior warning signal.

7. The metal detector as given in claim 6 wherein said memory means includes latch means to retain an alarm condition upon said detection means giving a predetermined number of warning signals within a plurality of said second time intervals.

8. A method of detecting ferromagnetic particles in a flowing fluid retained by a containing structure, said method having the following steps:

magnetizing a material that can be magnetized and demagnetized by causing a current to flow from a voltage source through coil means located contiguous with said material, said material being constructed and arranged to have nonconducting gap means therein in contact with said flowing fluid, said voltage source also connected across said gap;

collecting of said ferromagnetic particles at said gap means;

generating a warning signal by control means connected to said gap means and responsive to current flow from said voltage source upon said ferromagnetic particles bridging said gap means;

demagnetizing of said material by said control means in response to said warning signal; and carrying away said collected ferromagnetic particles from said gap means by said flowing fluid.

9. The method according to claim 8 including consecutive repeating of prior steps to give additional warning signals upon repeated bridging of said gap means.

10. The method according to claim 9 including a first step of mounting a probe means to said containing structure, said probe means having said material forming a part thereof.

11. The method according to claim 9 including detecting of ferromagnetic particles bridging said gap means during said collecting step by detection means, said detection means being a part of said control means in series with said gap means and said voltage source to give a detection output signal for generating said warning signal.

12. The method according to claim 11 wherein said magnetizing step includes said control means causing a magnetizing current to flow through said coil means, and said demagnetizing step includes said control means causing an alternating current to flow through said coil means in response to said warning signal.

13. The method according of claim 12 including simultaneous with said demagnetizing step a first timing by said control means to stop said alternating current and restore said magnetizing current within a first time interval.

14. The method according to claim 13 includes storing of said warning signal in memory means of said control means, second timing by said control means to determine if said warning signal reoccurs within a second time interval.

15. The method according to claim 14 includes latching an alarm signal in said control means if a predetermined number of said warning signals occur within consecutive said second time intervals during said repeating.

16. A control circuit adapted for use in conjunction with a metal detector to determine amount of ferromagnetic particles in a flowing fluid, said metal detector having semipermanent magnetic pole means with a space therein forming gap means in contact with said flowing fluid, said pole means being of a material that may be magnetized and demagnetized by current flow through a contiguous coil means, said control circuit comprising:

a voltage source for direct current and alternating current, said voltage source being electrically connected to provide a d.c. voltage potential across said gap means;

switch means connected to said voltage source, said switch means having a first position for connecting said direct current to said coil means to magnetize said pole means;

detector means connected in series with said gap means for giving a detector signal upon ferromagnetic particles collecting on said gap means to bridge thereacross, said detector signal operating said switch means for first disconnecting said direct current from said coil means and second connecting said alternating current to said coil means to demagnetize said pole means;

first timer means connected to said switch means, said first timer means being set by said detector signal to begin a first time interval, upon termination of said first time interval said first timer means giving a first timer signal to operate said switch means for second disconnecting of said alternating current from said coil means and restoring said first connection with said direct current to said coil means, and warning means for giving a warning signal upon receiving said detector signal.

17. The control circuit as given in claim 16 comprising second timer means actuated by said detector signal for setting a second time interval, memory means for receiving and retaining said detector signal for said second time interval, said memory means giving an increased degree of said warning signal if another of said detector signal occurs within said second time interval.

18. The control circuit as given in claim 17 wherein said memory means has a latching memory to retain said warning signal upon receiving a predetermined number of said detector signals within consecutive second time intervals.

19. The control circuit as given in claim 17 wherein said switch means includes an analog switch for switching between direct and alternating current.

20. The control circuit as given in claim 17 includes a clock means connected to said timer means, said timer means counting output pulses from said clock means to give said second time interval.

21. The control circuit as given in claim 19 wherein said control circuit combines an integrating waveform with said alternating current for said demagnetization of said coil means.

22. A method of cleaning a ferromagnetic metal detector in a flowing fluid, said method having the following steps: magnetizing a semipermanent magnet which magnet is part of said metal detector;

collecting ferromagnetic particles on said magnetized semipermanent magnet;

demagnetizing said semipermanent magnet following detection of said particles;

releasing said collected ferromagnetic particles in said flowing fluid; and remagnetizing of said semipermanent magnet.

23. The method of cleaning a ferromagnetic metal detector in accordance with claim 22 wherein said collecting step includes bridging a gap of said semipermanent magnet in contact with said flowing fluid, said demagnetizing of said semipermanent magnet being in response to a current flow through collected ferromagnetic particles bridging across said gap.

24. The method of cleaning a ferromagnetic metal detector in accordance with claim 23 wherein said releasing step includes a carrying away of said collected ferromagnetic particles by said flowing fluid.

25. The method of cleaning a ferromagnetic metal detector in accordance with claim 24 wherein said current flow generates a warning signal, said warning signal energizing a coil for said demagnetizing of said semipermanent magnet, said energizing being controlled by first timing means.

26. The method of cleaning a ferromagnetic metal detector in accordance with claim 25 includes recording said warning signal for a given time interval controlled by second timing means, and erasing said recording if additional warning signals are not received within said given time interval.

27. The method of cleaning a ferromagnetic metal detector in accordance with claim 24 includes repeating of the prior steps.

* * * * *